United States Patent [19]

Koppel et al.

[11] 3,897,424

[45] July 29, 1975

[54] PROCESS FOR 7-β-AMINO-7-α-METHOXY-CEPHALOSPORANIC ACID ESTERS AND RELATED COMPOUNDS

[75] Inventors: Gary A. Koppel; William H. W. Lunn, both of Indianapolis, Ind.

[73] Assignee: Eli Lilly and Company, Indianapolis, Ind.

[22] Filed: July 23, 1973

[21] Appl. No.: 381,470

[52] U.S. Cl. .............................. 260/243 C; 424/246
[51] Int. Cl. ............................................ C07d 99/24
[58] Field of Search ................................ 260/243 C

[56] References Cited
OTHER PUBLICATIONS

G. A. Koppel and R. E. Koehler, J. Amer. Chem. Soc. 95, 2403 (1973), QD1A5.

J. E. Baldwin et al., J. American Chem. Soc. 95, 2401 (1973), QD1A5.

H. Paul et al., Chem. Berichte, 98, 1450 (1965), QD1D4.

*Primary Examiner*—Nicholas S. Rizzo
*Assistant Examiner*—Mark L. Berch
*Attorney, Agent, or Firm*—William B. Scanlon; Everet F. Smith

[57] ABSTRACT

Process for preparing 7-β-Amino-7-α-methoxycephalosporin esters

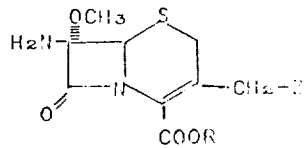

wherein Z is H or an organic radical, eg. acetoxy, methoxy, carbamoyloxy or 5-thio-1-methyltetrazol; comprising low temperature 7-methoxylation of a 7-(p-nitrobenzyloxycarbamido) cephalosporin ester; reduction of the methoxylation product to an intermediate reduction product; and treatment of the reduction product with silica gel. Methoxy amine nucleus esters are valuable intermediates for synthesis of antibiotics.

7 Claims, No Drawings

PROCESS FOR 7-β-AMINO-7-α-METHOXY-CEPHALOSPORANIC ACID ESTERS AND RELATED COMPOUNDS

BACKGROUND OF THE INVENTION

This invention relates to a process for the preparation of certain 7-amino-7-methoxycephalosporin nucleus esters. In particular it relates to a process for preparing 7-β-amino-7-α-methoxycephalosporanic acid esters and related 7-methoxy nucleus esters wherein the acetoxy group of the cephalosporanic acid is replaced with other substituent groups.

Cephalosporin antibiotics having a methoxyl group attached to the $C_7$ carbon atom of the β-lactam ring are known. For example, 7-methoxycephalosporin C and 7-(5-amino-5-carboxyvaleramido)-7-methoxy-3-carbamoyloxymethyl-3-cephem-4-carboxylic acid have been obtained by the fermentation of *Streptomyces lipmanii* and *Streptomyces clavuligerus* as described in J. Am. Chem. Soc. 93, 2308 (1971). A number of 7-acylamido-7-methoxycephalosporin antibiotics have been prepared by the direct methoxylation procedure described in co-pending application Ser. No. 301,694.

According to the latter method, a 7-acylamidocephalosporin is reacted at about −80°C. with lithium methoxide in methanol and thereafter with a positive halogen compound such as t-butyl hypochlorite to provide a 7-acylamido-7-methoxycephalosporin.

7-Amino-7-methoxycephalosporanic acid has been prepared by the N-deacylation of 7-methoxycephalosporin C via the phosphorus pentachloride/pyridine/methanol procedure as described in co-pending application Ser. No. 139,914, now abandoned. In co-pending application Ser. No. 298,165, filed Oct. 16, 1972, an improved N-deacylation method for the preparation of 7-amino-7-methoxycephalosporanic acid is described.

Although the foregoing methods for preparing the 7-methoxycephalosporins are useful methods, there is a need for alternative methods having a wider synthetic applicability. For instance, the direct methoxylation method employing lithium methoxide operates on 7-acylamidocephalosporins. Whereas a wide variety of 7-acylamidocephalosporins can be methoxylated in this method not all desired 7-acylamidocephalosporins can be methoxylated under the basic conditions of the method.

An object of this invention is to provide a new process for the preparation of 7-amino-7-methoxycephalosporin compounds which are valuable intermediates. In particular it is an object of this invention to provide a process for the preparation of 7-amino-7-methoxycephalosporanic acid esters, 7-amino-7-methoxydeacetoxycephalosporanic acid esters and related compounds.

SUMMARY

According to the process of this invention, a 7-amino-3-cephem ester (a cephalosporin nucleus ester), for example an ester of 7-aminocephalosporanic acid or 7-aminodeacetoxycephalosporanic acid, is first acylated with a haloformate ester of p-nitrobenzyl alcohol to form the corresponding 7β-(p-nitrobenzyloxycarbamido)-3-cephem ester. The carbamido ester is methoxylated in the 7-position by reacting the ester derivative in the presence of excess methanol at a temperature between about −120° and −25°C. with (1) lithium methoxide followed by (2) t-butyl hypochlorite. The methoxylation reaction mixture is acidified and the intermediate 7-β-(p-nitrobenzyloxycarbamido)-7-α-methoxy-3-cephem ester is recovered. The methoxylated carbamido cephem ester intermediate is then reduced with hydrogen in the presence of a palladium catalyst or with sodium dithionite to produce an isolable, basic, hexahydro reduction product of the 7-carbamido-7-methoxy-3-cephem ester. The hydrogenation product is recovered from the reduction mixture and is commingled in an inert solvent at ambient temperature with an excess of silica gel, as for example by stirring a solution of the reduction product with silica gel, to provide the 7-amino-7-methoxy-3-cephem ester. Alternatively the intermediate reduction product can be treated with an aqueous mineral acid at a pH between pH 4 and pH 6 to provide the 7-amino-7-methoxy-3-cephem ester.

The 7-methoxylated cephalosporin nucleus ester thus obtained can be acylated with an active derivative of a carboxylic acid by conventional methods to form 7-acylamido-7-methoxy-3-cephem esters. Removal of the ester group by known procedures affords a 7-acylamide-7-methoxy-3-cephem-4-carboxylic acid antibiotic compound.

DETAILED DESCRIPTION

The 7-β-amino-7-α-methoxy-3-cephem esters provided by the process of this invention are represented by the following Formula I.

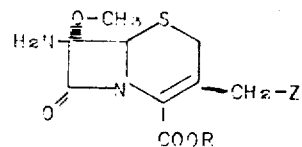

I wherein

Z is hydrogen, $C_2$-$C_4$ alkanoyloxy, $C_1$-$C_4$ alkoxy, $C_1$-$C_4$ alkylthio, a carbamoyloxy group of the formula

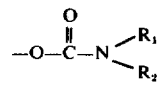

wherein $R_1$ and $R_2$ independently are hydrogen or $C_1$-$C_4$ lower alkyl, or Z is a five-membered heterocyclic thio group selected from the group consisting of a 5-thio tetrazole of the formula

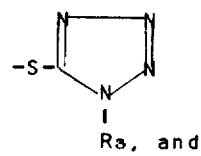

and a 2-thio-1,3,4-thia or oxadiazole of the formula

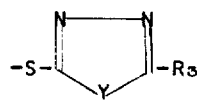

wherein
Y is O or S and $R_3$ is hydrogen, $C_1$–$C_4$ alkyl or phenyl; and

R is benzyl, p-methoxybenzyl, p-nitrobenzyl, diphenylmethyl or 2,2,2-trichloroethyl.

In the above definition, the term "$C_2$–$C_4$ alkanoyloxy" refers to acetoxy, propionoxy, butyryloxy, iso-butyryloxy and the like. "$C_1$–$C_4$ alkoxy" refers to the lower alkoxy groups such as methoxy, ethoxy, iso-propoxy, n-butoxy, sec-butoxy and the like. "$C_1$–$C_4$ alkyl thio" refers to the lower alkyl thio groups such as methylthio, ethylthio, n-propylthio, iso-butylthio and the like. "$C_1$–$C_4$ Alkyl" means methyl, ethyl, n-propyl, iso-propyl, n-butyl, sec-butyl, and iso-butyl.

Representative of the carbamoyloxy groups

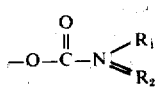

within the definition of Z are, carbamoyl, N-methylcarbamoyl, N,N-dimethylcarbamoyl, N-ethylcarbamoyl, N-ethyl-n-methylcarbamoyl, N-n-propylcarbamoyl, N-n-butylcarbamoyloxy, N-n-propyl-N-methylcarbamoyloxy and the like.

Illustrative of the five-membered heterocyclic thio groups within the meanings of Z are, 1-methyl-5-thiotetrazole, 1-phenyl-5-thiotetrazole, 5-methyl-2-thio-1,3,4-thiadiazole, 5-ethyl-2-thio-1,3,4-thiadiazole, 5-phenyl-2-thio-1,3,4-thiadiazole, 5-methyl-2-thio-1,3,4-oxadiazole, and 5-phenyl-2-thio-1,3,4-oxadiazole.

Illustrative of the methoxy cephem esters of the Formula I are diphenylmethyl 7β-Amino-7α-methoxy-3-acetoxymethyl-3-cephem-4-carboxylate, 2,2,2-trichloroethyl 7β-amino-7α-methoxy-3-methyl-3-cephem-4-carboxylate, p-methoxybenzyl 7β-amino-7-α-methoxy-3-methoxymethyl-3-cephem-4-carboxylate, diphenylmethyl 7β-amino-7α-methoxy-3-methylthiomethyl-3-cephem-4-carboxylate, p-nitrobenzyl 7β-amino-7α-methoxy-3-carbamoyloxymethyl-3-cephem-4-carboxylate, diphenylmethyl 7β-amino-7α-methoxy-3-(1-methyltetrazol-5-ylthiomethyl)-3-cephem-4-carboxylate represented by the formula

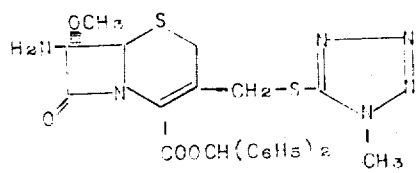

diphenylmethyl 7β-amino-7α-methoxy-3-(5-methyl-1,3,4-thiadiazol-2-ylthiomethyl)-3-cephem-4-carboxylate represented by the formula

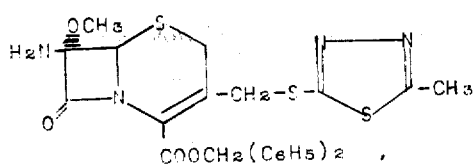

and benzyl 7β-amino-7α-methoxy-3-(5-phenyl-1,3,4-oxadiazol-2-ylthiomethyl)-3-cephem-4-carboxylate.

These esters are valuable compounds useful in the synthesis of 7-acylamido-7-methoxy-3-cephem-4-carboxylic acid antibiotic compounds, for example, those described in copending application Ser. No. 301,694.

In the process of this invention a 7-amino-3-cephem ester of the formula

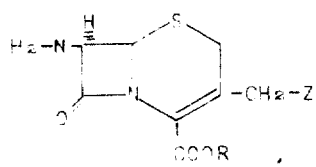

wherein Z and R have the same meanings as defined in Formula I, is acylated with a haloformate ester of p-nitrobenzyl alcohol to provide the corresponding 7-β-(p-nitrobenzyloxycarbamido)-3-cephem ester of the formula II

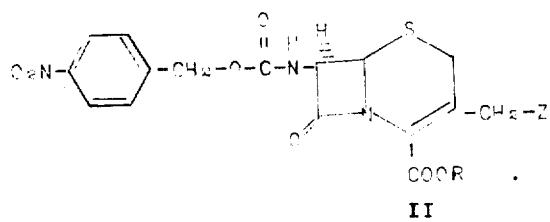

II

The acylation is carried out in an inert solvent in the presence of an acid binding agent for example, a tertiary amine such as triethylamine, diethylaniline of pyridine or an inorganic base such as sodium or potassium bicarbonate or carbonate. Inert solvents which can be used in the acylation include for example, acetone, ethyl acetate, acetonitrile, dimethylformamide or other suitable solubilizing agent. Haloformate esters of p-nitrobenzyl alcohol which can be used are the bromo and chloroformate esters. The chloroformate ester is preferred.

The acylation reaction affords high yields on the order of 70 percent of the 7-β-(p-nitrobenzyloxycarbamido-3-cephem esters.

Alternatively the 7-amino cephalosporin nucleus can be acylated as the free acid, and following isolation of the 7-β-(p-nitrobenzyloxycarbamido)-3-cephem-4-carboxylic acid, the product can be esterified to provide the desired ester of the above Formula II. the starting materials in the process of this invention. In the latter alternate method of acylation, the free acid form of the cephalosporin nucleus is desirably solubilized in the inert solvent prior to acylation by forming a soluble bis-trimethylsilyl derivative thereof. Thus for example, a suspension of the acid nucleus in the solvent, eg. acetonitrile, is treated with an excess of bis-trimethylsilyl acetamide to form the soluble silyl derivative of the nucleus. The trimethylsilyl derivative is then acylated with the p-nitrobenzyl haloformate to provide, after hydrolysis, the 7-β-(p-nitrobenzyloxycarbamido)-3-cephem-4-carboxylic acid.

The 7-carbamido ester of the Formula II thus obtained is reacted in an inert, anhydrous solvent at a subzero temperature between about −120° and −25°C. and preferably at −100° to −75°C., with between 2 and 6 molar equivalents of lithium methylate in excess of methanol to generate, in situ, the anionic form of the starting material which may be represented by the formula

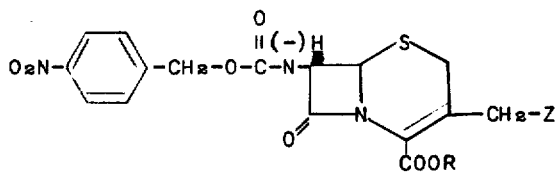

The anionic form of the starting carbamido ester forms rapidly and is substantially stable at the reaction temperature. The reaction mixture is stirred for about five minutes to insure completion of anion generation and then at least one molar equivalent of t-butyl hypochlorite is added to the cold reaction mixture with stirring. The mixture is stirred for an additional 15 or 20 minutes and is then acidified, preferably with a lower carboxylic acid such as formic acid or glacial acetic acid, to provide a 7-methoxylated carbamido cephalosporin ester of the Formula III

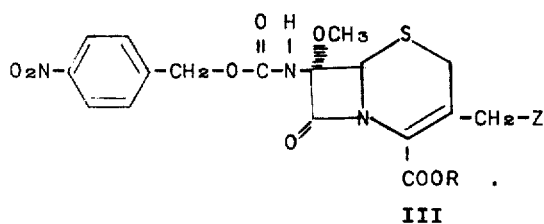

Following the addition of the formic or acetic acid, any excess of t-butyl hypochlorite present in the reaction mixture is desirably destroyed by adding trimethylphosphite to the cold acidified mixture in an amount corresponding to the excess of t-butyl hypochlorite used in the reaction.

Inert solvents which can be employed are for example, tetrahydrofuran, dioxane, the dimethyl ether of ethylene glycol, dimethylformamide, dimethylacetamide and poly-ethers such as diethylene glycol dimethyl ether. Any suitable inert solvent which will provide a fluid reaction medium at the process temperature may be used. However, it is required that such solvents be substantially anhydrous since water can interfere with the anion formation and reduce the yields of the methoxylated product. Tetrahydrofuran is a preferred solvent.

Lithium methoxide is conveniently prepared in the cold inert solvent with methyl lithium and methanol prior to the addition of the starting material.

The methoxylation is carried out in the following manner. The inert solvent, e.g. tetrahydrofuran, is cooled to about −5°C. and dry methanol is added. Methyl lithium is then added and the temperature of the mixture is lowered to below −25°C. and preferably between −100° and −75°C. The starting material, a 7-β-(p-nitrobenzyloxycarbamido)-3-cephem ester of the Formula II is added to the cold mixture with stirring to generate the anionic form of the carbamido ester in situ. The preparation of the lithium methoxide and the anion of the starting material is desirably carried out in an inert atmosphere, for example under nitrogen, although an inert atmosphere is not essential.

Next the t-butyl hypochlorite is added rapidly to the cold mixture and the reaction mixture is stirred at the reaction temperature for about 20 minutes. The reaction is quenched by adding an excess of glacial acetic acid or formic acid to the cold reaction mixture. The mixture is evaporated to dryness and the reaction product is extracted from the residue with an organic solvent such as methylene chloride or ethyl acetate. The extract is washed to remove excess acid and halogen, is dried and evaporated to yield the methoxylated product of the Formula III. The product can be purified by crystallization or preferably by chromatography over silica.

As noted above the methoxylation reaction is carried out in excess methanol and accordingly an excess is initially added to the inert solvent prior to the addition of methyl lithium.

The methoxylation of a carbamido ester of the Formula II is carried out by following the procedures for the methoxylation of 7-acylamidocephalosporins as described in co-pending application Ser. No. 301,694. The p-nitrobenzyloxycarbamido cephem esters employed in the present method differ structurally, however, from the acetamido compounds employed in the method of Koppel as described in application Serial No. 301,694. The carbamido derivatives herein, having the following structural feature comprising an oxycarbonyl function,

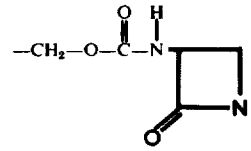

are surprisingly stable under the basic methoxylation conditions of the Koppel method wherein starting materials having the following acetamido structural moiety are used.

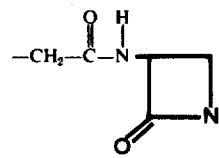

When Z in the Formula I represents a thiotetrazole, thio 1,3,4-thiadiazole or oxadiazole group the methoxylation reaction is preferably carried out over the lower temperatures of the reaction temperature range, notably at between −120° and −70°C.

Following the methoxylation reaction; the p-nitrobenzyloxycarbonyl group is removed from the 7β-(p-nitrobenzyloxycarbamido)-7α-methoxy-3- cephem ester with mild reduction followed by acidic hydrolysis under conditions at which the 7-amino-7-methoxy-3-cephem ester is stable. According to a feature of this invention it has been discovered that the p-nitrobenzyloxycarbonyl group can be removed to obtain the 7-methoxylated nucleus ester by a two step cleavage procedure comprising first the mild reduction of the 7β-(p-nitrobenzyloxycarbamido) group of the methoxy-3-cephem ester to obtain an intermediate reduction product, and secondly, by treating the reduction product under mildly acidic conditions to effect removal of the reduced side chain. In the first step of this two-step reductive-acidic cleavage of the 7β-(p-nitrobenzyloxycarbonyl) side chain, reduction is carried out by hydrogenation in the presence of a palladium catalyst or with the alkali and alkaline earth metal dithionates in buffered solution.

The intermediate reduction product is isolated and is then subjected to mild acidic hydrolysis to effect the removal of the reduced side chain and provide the 7β-amino-7α-methoxy-3-cephem-4-carboxylic acid ester. The acidic hydrolysis is carried out in solution at a pH between about pH 4 and pH 6 or by commingling a solution of the reduction product intermediate with an insoluble, finely divided solid having a weakly acidic surface and preferably silica gel.

When the first step of the cleavage reaction is carried out by hydrogenation the reduction is performed as follows.

The recovered 7β-(p-nitrobenzyloxycarbamido)-7α-methoxy-3-cephem ester of the Formula III is dissolved in an inert solvent and hydrogenated in the presence of a palladium catalyst until hydrogen absorption ceases. The hydrogenation is carried out at or about room temperature for example between about 20° and 35°C. and under a hydrogen pressure of between one and five atmospheres. One atmosphere of hydrogen is sufficient and higher pressures are not necessary. The reduction proceeds slowly as hydrogen uptake continues for about 12 hours. The rate of hydrogenation can be enhanced by the addition of a small amount of pyridine to the hydrogenation mixture.

The reduction proceeds until approximately 3 moles of hydrogen per mole of substrate compound has been absorbed. The reduction mixture is filtered to remove the catalyst and the filtrate is evaporated to dryness in vacuo to yield the reduction product as a residue.

The hydrogenation can be carried out in a suitable unreactive or nonreducable solvent such as tetrahydrofuran, dioxane, or DMF. Any solvent in which the methoxylated intermediate of Formula III is at least partially soluble can be employed. Tetrahydrofuran is a preferred solvent, the starting materials being substantially soluble therein at room temperature.

Palladium catalysts which can be used include finely divided palladium alone or palladium on an inert support such as carbon, alumina, kieselguhr, barium carbonate, silica, or other inert support. A desirable catalyst form is 5% Pd on carbon or 10% Pd on carbon.

For best results the catalyst is prereduced, and for each gram of substrate between 0.5 and 1 gram of catalyst is used.

The hydrogenation of the compound of Formula III is carried out in the following manner. The catalyst is suspended in a suitable solvent and hydrogenated at room temperature for about 30 minutes in the presence of a small amount of pyridine. The methoxylated cephem ester of the Formula III, in solution in a suitable solvent, is then added to the reduced catalyst suspension and the hydrogenation is carried out under about 30 psi hydrogen pressure at room temperature.

The hydrogenation is conveniently carried out in a Parr low pressure hydrogenation apparatus. It can also be carried out in an open vessel at one atmosphere while hydrogen gas is bubbled through a solution of the substrate compound containing the catalyst in suspension. Following cessation of hydrogen absorption, the reduction mixture is filtered to remove the catalyst and the filtrate is evaporated to yield the intermediate reduction product as a residue.

The reduction of a 7β-(p-nitrobenzyloxycarbamidol)-7α-methoxy-3-cephem ester in the reductive-acidic cleavage process step is also conveniently carried out with an alkali or alkaline earth metal salt of dithionic acid ($H_2S_2O_6$) in an inert, water miscible solvent buffered to maintain the pH of the mixture at about pH 7-8. Dithionate salts such as potassium dithionate, sodium dithionate and calcium dithionate can be used however, sodium dithionate is the preferred salt.

The reduction is carried out at a temperature between about −5° and 25°C. and preferably at 0° to 10°C. Water miscible inert solvents which can be used include methanol, ethanol, isopropanol, acetonitrile, and dimethylformamide. Mistures of such solvents can also be used in the reduction and a mixture of methanol and acetonitrile is a desirable solvent mixture.

The reduction mixture is buffered to maintain the pH at about pH 7-8. Dibasic phosphate buffer ($K_2HPO_4$) is a convenient buffer which maintains the pH of the mixture at about pH 7.0-7.5.

The dithionate salt is employed in excess and generally, approximately 10 moles of dithionate salt per mole of the methoxylated carbamido cephem ester is used.

The reduction is carried out by adding a buffered solution of the dithionate salt, preferably sodium dithionate, to a cold (0°-15°C) solution of the methoxylated carbamido ester with stirring. The addition is preferably carried out portionwise or dropwise although the mode of addition is not critical. The reduction proceeds to completion rapidly on a small scale, and is essentially complete after the addition of the dithionate is finished.

Following the addition of the buffered dithionate salt solution, the reaction mixture is poured into a mixture of a water immiscible organic solvent and dibasic phosphate buffer. Suitable organic solvents which can be used are ethyl acetate, methylene chloride, or chloroform. The intermediate reduction product is extracted into the organic solvent and the solution is washed, dried and evaporated to yield the intermediate reduction product.

The structure of the intermediate reduction product obtained via reduction with hydrogen and palladium catalyst or via dithionate salt reduction has not as yet been determined. However, based on its basic character, and the structure of the starting material, the intermediate appears to be the p-aminobenzyloxycarbamido derivative of the formula

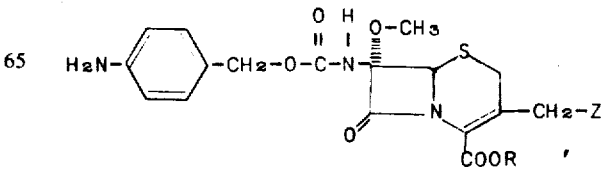

some nitro group intermediate reduction product or possibly a p-amino quinoid type product.

When in the Formula I, Z represents a lower alkyl thio group, a thio tetrazole group, a thio thiadiazole or thio oxadiazole group the reduction step in the removal of the p-nitrobenzyloxycarbonyl side-chain is preferably carried out with buffered sodium dithionate. Although the side chain can be reduced via hydrogenation with hydrogen and a palladium catalyst better yields of the reduction product and ultimately, of the methoxy nucleus ester are obtained with the former reagent.

The intermediate reduction product is then hydrolyzed under mildly acidic conditions to effect removal of the reduced carbamido side chain and provide the 7β-amino-7α-methoxy-3-cephem ester.

The mildly acidic cleavage is carried out in solution or in the presence of silica gel (silicic acid in gel form). Accordingly the reduction product is dissolved in an organic solvent such as ethyl acetate, acetonitrile or methylene chloride and vigorously stirred or shaken with a dilute aqueous mineral acid such as hydrochloric acid, sulfuric acid, or phosphoric acid while maintaining the pH at between about 4 and 6. The methoxylated nucleus ester is recovered from the organic phase in a conventional manner.

Preferably, the mildly acidic cleavage of the intermediate reduction product can be carried out in the presence of silica gel. According to this preferred mode of cleavage, the intermediate reduction product is dissolved in a suitable solvent, for example a chlorinated hydrocarbon solvent such as chloroform or methylene chloride, an ester such as ethyl acetate, a ketone such as acetone, or methyl isobutyl ketone, an ether such as tetrahydrofuran or dioxane, or other suitable solvent and silica gel is added to the solution. The solution is stirred for about 2 hours and is filtered. The silica gel is washed on the filter and the filtrate and washings are combined and evaporated in vacuo to dryness to yield a 7β-amino-7α-methoxy-3-cephem ester of the Formula I.

The silica gel employed may be any available grade of silica gel, however best results are obtained with high quality chromatography grades such as those employed in thin layer chromatography.

In an alternative procedure, the reduction product can be passed over a column packed with silica gel at a controlled rate such that the partially reduced 7-carbamido substituent is cleaved on the gel to obtain the 7-amino-7-methoxy-3-cephem ester in the eluate.

Accordingly, this invention has as one of its features the two step removal of the p-nitrobenzyloxycarbonyl substituent from the 7-methoxy-3-cephem nucleus ester which comprises reducing a 7β-(p-nitrobenzyloxycarbamido)-7α-methoxy-3-cephem ester to obtain an intermediate reduction product and thereafter commingling the reduction product with silica gel to effect the removal of the reduced form of the 7-carbamido group to yield the 7β-amino-7-α-methoxy-3-cephem ester.

In a specific embodiment of this invention, 7-aminocephalosporanic acid is suspended in dry acetonitrile and bis-trimethylsilyl acetamide is added to effect solubilization of the nucleus via formation of the trimethylsilyl derivative. The nucleus is acylated with p-nitrobenzyl chloroformate to form 7β-(p-nitrobenzyloxycarbamido)-3-acetoxymethyl-3-cephem-4-carboxylic acid. The carbamido cephem acid is esterified with diphenyldiazomethane to form the diphenylmethyl ester and the ester is methoxylated in dry tetrahydrofuran at −65°C. with lithium methylate, methanol and t-butyl hypochlorite to provide diphenylmethyl 7β-(p-nitrobenzyloxycarbamido)-7α-methoxy-3-acetoxymethyl-3-cephem-4-carboxylate. The methoxylated ester is hydrogenated in tetrahydrofuran at room temperature in the presence of 5% palladium on carbon until hydrogen uptake ceases, the reduction mixture is filtered, the filtrate is evaporated and the residue is dissolved in methylene chloride. Silica gel is added to the solution and the mixture is stirred at room temperature for about 2 hours. The mixture is evaporated to yield diphenylmethyl 7β-amino-7α-methoxy-3-acetoxymethyl-3-cephem-4-carboxylate.

In a further embodiment of this invention diphenylmethyl 7-amino-3-(1-methyltetrazol-5-ylthiomethyl)-3-cephem -4-carboxylate is acylated with the chloroformate ester of p-nitrobenzyl alcohol, and the diphenylmethyl-7-(p-nitrobenzyloxycarbamido)-3-cephem-4-carboxylate obtained is methoxylated in dry THF at about −100°C. with lithium methylate/methanol/t-butyl hypochlorite to yield diphenylmethyl 7β-(p-nitrobenzyloxycarbamido)-7α-methoxy-3-(1-methyltetrazole-5-ylthiomethyl)-3-cephem-4-carboxylate. The methoxylated cephem nucleus ester product is reacted at ice bath temperature in a mixture of methanol and acetonitrile with a buffered sodium dithionate solution containing excess dithionate, the intermediate reduction product is recovered from the reduction mixture, is dissolved in methylene dichloride and silica gel is added to the solution. The silica gel suspension is stirred for about two hours, is filtered and the filtrate evaporated to yield diphenylmethyl 7β-amino-7α-methyoxy-3-(1-methyltetrazol-5-ylthiomethyl)-3-cephem-4-carboxylate.

Illustrative of the 7-amino-3-cephem esters which are employed in the preparation of the starting materials in the process of the invention include the following: diphenylmethyl 7-amino-3-acetoxymethyl-3-cephem-4-carboxylate, (the diphenylmethyl ester of 7-ACA), p-nitrobenzyl 7-amino-3-methyl-3-cephem-4-carboxylate (the p-nitrobenzyl ester of 7-ADCA), 2,2,2-trichloroethyl 7-amino-3-methoxymethyl-3-cephem-4-carboxylate, diphenylmethyl 7-amino-3-(1-methyltetrazole-5-yl-thiomethyl)-3-cephem-4-carboxylate, p-methoxybenzyl 7-amino-3-acetoxymethyl-3-cephem-4-carboxylate, benzyl 7-amino-3-methyl-3-cephem-4-carboxylate, diphenylmethyl 7-amino-3-(5-methyl-1,3,4-thiadiazol-2-yl-thiomethyl)-3-cephem-4-carboxylate, diphenylmethyl 7-amino-3-(5-methyl-1,3,4-oxadiazol-2-ylthiomethyl)-3-cephem-4-carboxylate, p-methoxybenzyl 7-amino-3-methylthiomethyl-3-cephem-4-carboxylate, p-nitrobenzyl 7-amino-3-carbamoyloxymethyl-3-cephem-4-carboxylate, and 2,2,2-trichloroethyl 7-amino-3-dimethylcarbamoyloxymethyl-3-cephem-4-carboxylate.

The foregoing nucleus esters are readily available compounds which are prepared by methods known in the cephalosporin art.

The well known cephalosporin nucleus 7-aminocephalosporanic acid (7-ACA) is prepared by the N-deacylative of cephalosporin C. 7-aminodeacetoxycephalosporanic acid (7ADCA) can be prepared by the hydrogenolysis of 7-ACA. The 3-thioheterocyclic substituted nucleus esters are prepared by reacting a 7-amino-protected cephalosporanic acid ester in base with the desired heterocyclic thiol, for example, 1-methyltetrazole-5-thiol, followed by removal of the protecting group.

The 7β-(p-nitrobenzyloxycarbamido)-7α-methoxy-3-cephem esters of the Formula III provided by this invention are novel compounds which are valuable intermediates useful in the present process. A preferred group of these intermediates is represented by the Formula III wherein Z is hydrogen, acetoxy or methoxy.

A further preferred group is represented by the Formula III wherein Z is

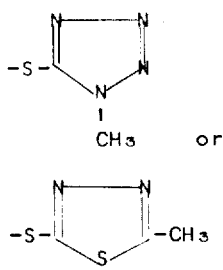

for example diphenylmethyl 7β-(p-nitrobenzyloxycarbamido)-7α-methoxy-3-(1-methyltetrazol-5-ylthiomethyl)-3-cephem-4-carboxylate and p-nitrobenzyl 7β-(p-nitrobenzyloxycarbamido)-7α-methoxy-3-(5-methyl-1,3,4-thiadiazol-2-ylthiomethyl)-3-cephem-4-carboxylate.

Preferred ester groups represented by R are the diphenylmethyl, p-nitrobenzyl and 2,2,2-trichloroethyl groups. These groups are more desirable since they impart greater insolubility on the intermediates and products of the process and thereby enhance their recovery and crystallization.

The 7β-amino-7α-methoxy-3-cephem esters of the Formula I are valuable intermediates useful in the preparation of 7-acylamido-7-methoxy-3-cephem-4-carboxylic acid antibiotics. For example an ester of 7β-amino-7α-methoxy-3-acetoxymethyl-3-cephem-4-carboxylic acid of the Formula I can be acylated with thiophene-2-acid chloride in aqueous acetone in the presence of an acid binding agent, for example sodium bicarbonate, to yield the 7-[2-(2-thienyl) acetamido]-7-methoxy-3-acetoxymethyl-4-carboxylic acid ester. The ester group is removed by known procedures to afford the 7-methoxy derivative of the well known antibiotic cephalothin.

A wide variety of 7-acylamido-7-methoxy cephalosporin antibiotics can be prepared with the compounds of the Formula I. For example, those antibiotics described in co-pending application Ser. No. 301,694, filed Oct. 27, 1972, and in J. Am. Chem. Soc. 94 [4] 1410 (1972).

The following examples are provided to further illustrate the process and compounds of this invention.

The abbreviations occuring in the examples refer to the following:

THF - tetrahydrofuran
nmr - nuclear magnetic resonance spectrum
CDCl₃ - deuterated chloroform
s - singlet
d - doublet
m - multiplet.

EXAMPLE 1

Diphenylmethyl 7-β-p-Nitrobenzyloxycarboxamido-7-α-methoxycephalosporanate

To a suspension of 64 g. of 7-aminocephalosporanic acid in 500 ml. of dry acetonitrile was added with stirring at room temperature 60 ml. of bis-trimethylsilyl acetamide. A complete solution was obtained within 45 minutes with stirring. Approximately 90 minutes after the addition of the bis-trimethylsilyl acetamide 54.4 g. of p-nitrobenzyl chloroformate was added to the solution with stirring. After about one hour the reaction mixture was poured into 2 liters of ice water with vigorous agitation to precipitate the reaction product as an oily gum. Methylene chloride was added to the cold mixture to dissolve the gum. The two phase mixture was filtered through a filter aide to remove insolubles and the organic phase of the clarified filtrate was separated. The organic phase was washed twice with water and the product was extracted from the washed organic phase with an aqueous solution of sodium bicarbonate (52 g. in 500 ml. of water). The bicarbonate extract was washed twice with methylene chloride and was diluted with 250 ml. of acetonitrile and 1-liter of ice-water and then acidified to pH 4.5 by the dropwise addition of 1N hydrochloric acid with vigorous stirring. The reaction mixture became viscous with the formation of a gelatinous precipitate and was diluted with three-liters of water. With vigorous agitation the pH was lowered to pH 1.7 by the addition of 20% hydrochloric acid. The suspension was filtered and the product was washed on the filter with water. The washed precipitate was dried in vacuo to give 66.7 g. of 7-β-p-nitrobenzyloxycarbamidocephalosporanic acid as an off-white powder.

To a solution of 61.5 g. of the dry reaction product in 200 ml. of dry tetrahydrofuran was added with stirring 32 g. of diphenyldiazomethane. Nitrogen evolution was essentially complete after one hour. After 2 hours the mixture was evaporated on a rotary evaporator to remove the solvent and the oily residue was dissolved in a small volume of methylene chloride. The diphenylmethyl ester product was precipitated from solution as a heavy oil with hexane. The bulk of the methylene chloride was removed from the mixture by evaporation in vacuo and the supernatant hexane was decanted from the oily residue. The oily product was purified by two repeated precipitations from methylene chloride with hexane. The final light brown residue was dried in vacuo to give 85.3 g. of diphenylmethyl 7-β-p-nitrobenzyloxycarboxamidocephalosporanate as a solid foam. Additional product was recovered from the pooled hexane supernatants.

To 150 ml. of dry tetrahydrofuran maintained under a nitrogen atmosphere at ice bath temperature was added with stirring 22 ml. of a solution of methyl lithium in ether followed by 35 ml. of methanol. After 10 minutes the mixture was cooled to a temperature of −70°C. in a dry ice-acetone mixture and a solution of 5.18 g. of diphenylmethyl 7-β-p-nitrobenzyloxycarboxamidocephalosporanate in 50 ml. of dry tetrahydrofuran was added rapidly while the temperature was maintained below −65°C. After 5 minutes 1.26 ml. (10.6 mmole) of t-butyl hypochlorite was added rapidly to the reaction mixture. After about 40 minutes the reaction was quenched by adding 28 ml. of glacial acetic acid followed by the addition of 0.5 g. (0.47 ml.) of trimethylphosphite to destroy any excess oxidant. The reaction mixture was allowed to warm to 0°C. and was then evaporated in vacuo to a gum. The gummy residue was dissolved in methylene chloride and the solution was washed with water, an aqueous solution of sodium bicarbonate and then again with water. The washed solution was dried and evaporated to dryness to yield 4.57 g. of diphenylmethyl 7-β-p-nitrobenzyloxycarboxamido-7α-methoxycephalosporanate as a solid foam. Diphenylmethyl 7β-amino-7β-methoxycephalosperanate

EXAMPLE 2

A suspension of 1.5 g. of 5% palladium on carbon in 25 ml. of tetrahydrofuran containing 0.661 ml. of pyridine was stirred for 30 minutes under a hydrogen pressure of two atmospheres. A solution of 4.32 g. of diphenylmethyl 7-β-p-nitrobenzyloxycarboxamido-7-α-methoxycephalosporanate in 50 ml. of tetrahydrofuran was added to the catalyst suspension and the mixture was hydrogenated at room temperature for 6.5 hours under two atmospheres of hydrogen. The catalyst was filtered and the filtrate was evaporated in vacuo to yield 4.10 g. of the reduction product.

The reduction product (1.5 g.) was dissolved in 24 ml. of methylene chloride and 2.1 g. of silica gel (Merck 7729) were added. The suspension was stirred for 2 hours and was then filtered. The silica gel was washed on the filter with 36 ml. of methylene chloride and the filtrate and washings were evaporated to yield 880 mg. of diphenylmethyl 7-amino-7-methoxycephalosporanate as a brown oil.

EXAMPLE 3

2,2,2-Trichloroethyl
7β-(p-nitrobenzyloxycarbamido)-7α-methoxydeacetoxycephalosporanate To a solution of 2.89 g. (5 mmole) of 2,2,2-trichloroethyl 7-aminodeacetoxycephalosporanate p-toluenesulfonate salt in 25 ml. of methylene chloride was added 0.51 g. (0.7 ml.) of triethylamine to provide almost a complete solution. Next, 0.8 g. of pyridine were added to the solution followed by 1.79 g. (5.5 mmole) of p-nitrobenzyl chloroformate. The mixture was stirred for 20 min. at room temperature and thereafter was washed with an equal volume of dilute hydrochloric acid and with water. The organic layer was separated, dried and was evaporated in vacuo to yield 2.64 g. of 2,2,2-trichloroethyl 7β-p-nitrobenzyloxycarboxamidodeacetoxycephalosporanate as a light-yellow solid.

To 250 ml. of dry tetrahydrofuran at 0°C. were added 21 ml. of a 1.69 N solution of methyl lithium in diethyl ether and 40 ml. of methanol, and the solution was cooled to a temperature of −70°C. A solution of 5.38 g. (10 mmole) of 2,2,2-trichloroethyl 7β-(p-nitrobenzyloxycarbamido)-3-methyl-3-cephem-4-carboxylate in 50 ml. of THF was added. Next, 10 ml. of a 1,2N solution of 5-butyl hypochlorite in carbon tetrachloride was added rapidly and the mixture was stirred for 30 minutes at −70°C. The reaction mixture was then treated with 40 ml. of glacial acetic acid and then with 0.3 ml. of trimethyl phosphite. The reaction mixture was evaporated to dryness and the residue was extracted with methylene chloride and the extract was washed with water, an aqueous solution of sodium bicarbonate and again with water. The washed extract was dried and evaporated to dryness to yield 5.59 g. of 2,2,2-trichloroethyl 7β-(p-nitrobenzyloxycarbamido)-7α-methoxy-deacetoxycephalosporanate.

EXAMPLE 4

A solution of 1.08 g, of 2,2,2-trichloroethyl 7β-(p-nitrobenzyloxycarbamido)-7α-methoxy-3-methyl-3-cephem-4-carboxylate in 15 ml. of THF was added to a suspension of 750 mg. of 5% palladium on carbon in 10 ml. of THF which had been prereduced for 45 minutes under hydrogen. The mixture was stirred for 20 hours under one atmosphere of hydrogen and the catalyst was filtered. The filtrate was evaporated to dryness to yield 0.98 g. of reduction product as a residual yellow foam.

The yellow residue was dissolved in chloroform and chromatographed over preparative silica gel chromatography plates. Elution was carried out with benzene:methanol (6:1 v:v). The developed chromatogram showed a heavy band preceded by two lighter bands. The heavy band material was scraped from the plate and extracted with methylene chloride. The extract was filtered and evaporated to dryness to yield 327 mg. of 2,2,2-trichloroethyl 7β-amino-7α-methoxy-3-methyl-3-cephem-4-carboxylate.

EXAMPLE 5 p-Nitrobenzyl
7β-(p-nitrobenzyloxycarbamido)-7α-methoxydeacetoxycephalosporanate To a stirred slurry of 5.4 g, (10 mmole) of the p-toluenesulfonic acid salt of p-nitrobenzyl 7-aminodeacetoxycephalosporanate in 100 ml of dry acetonitrile was added 1.02 g. (10 mmole) of triethylamine and the initially thick slurry formed a slight suspension. Next 1.6 g. of pyridine (20 mmole) were added, followed by the addition of a slurry of 2.4 g. (11 mmole) of p-nitrobenzyl chloroformate in 5 ml. of acetontrile. The temperature of the mixture was maintained between 20° and 25° C. The reaction mixture was stirred for 15 minutes during which time a heavy, white crystalline precipitate of p-nitrobenzyl 7-(p-nitrobenzyloxycarbamido)-deacetoxycephalosporanate formed. The reaction mixture was cooled in an ice water bath and the product collected by filtration. The white crystalline product was air dried to yield 3.34 g. of product. The mother liquor was concentrated to yield 0.88 g. of additional product.

To 20 ml. of dry THF, cooled to ice bath temperature and stirred under nitrogen, were added 1 ml. of a 1.76 N solution of methyl lithium in diethyl ether and 2 ml. of dry methanol. The solution was stirred for about 5 minutes and was then cooled to dry ice-acetone bath temperature. A solution of 0.265 g. of n-nitrobenzyl 7-(p-nitrobenzyloxycarbamido)-deacetoxycephalosporanate in 5 ml. of THF was added to the cold solution. After about 2 minutes 0.072 ml. of t-butyl hypochlorite were added and the mixture was stirred for 15 minutes. The reaction was quenched with 2 ml. of acetic acid and the mixture was evaporated to dryness under vacuum. The residue was dissolved in 50 ml. of methylene chloride and the solution was washed with water and a dilute aqueous solution of sodium bicarbonate. The washed solution was dried and evaporated to yield 267 mg. of p-nitrobenzyl 7β-(p-nitrobenzyloxycarbamido)-7α-methoxydeacetoxycephalosporanate.

EXAMPLE 6 p-Nitrobenzyl 7β-amino-7α-methoxydeacetoxycephalosporanate

The product obtained as described in Example 5 was hydrogenated at room temperature for 6.5 hours in 25 ml. of THF containing a small amount of pyridine in the presence of 5 percent palladium on carbon. The catalyst was filtered and the filtrate was evaporated to dryness. The residue was dissolved in 10 ml. of methylene chloride and about 0.3 g. of chromatography grade silica gel were added. The mixture was stirred for about 2 hours, was filtered and the filtrate evaporated to dryness to yield p-nitrobenzyl 7β-amino-7α-methoxydeacetoxycephalosporanate.

EXAMPLE 7

Diphenylmethyl 7β-(p-nitrobenzyloxycarbamido)-7α-methoxy-3-(1-methyltetraxol-5-ylthiomethyl)-3-cephem-4-carboxylate Diphenylmethyl 7-(p-nitrobenzyloxycarbamido)-3-(1-methyltetrazol-5-ylthiomethyl)-3-cephem-4-carboxylate was prepared by reacting p-nitrobenzyl chloroformate with diphenylmethyl 7-amino-3-(1-methyltetrazol-5-ylthiomethyl)-3-cephem-4-carboxylate according to the acylation procedure described by Example 1. The carbamido tetrazole cephem ester product was methoxylated as follows.

To 125 ml. of dry THF under nitrogen at 5° C. was added 9.6 ml. of 1.83 N methyl lithium in diethyl ether and 20 ml. of dry methanol. The solution was cooled to a temperature of −94° C. in a methanol isobutanol bath which was treated with liquid nitrogen and ethanol. To the cold solution was added a solution of 3.37 g. (5 mmole) of diphenylmethyl 7-(p-nitrobenzyloxycarbamido)-3-(1-methyltetrazol-5-ylthiomethyl)-3-cephem-4-carboxylate in 30 ml. of THF. The cold mixture was stirred for 2 minutes and 0.8 ml. of t-butyl hypochlorite were added. The reaction mixture was allowed to warm to −70° C. over 30 minutes with stirring. The mixture was maintained at −70° C. for 10 minutes before 20 ml. of glacial acetic acid and 1 ml. of trimethylphosphite were added.

The reaction mixture was worked up and the product recovered by following the procedures described by Example 1 to afford 3.6 g. of crude diphenylmethyl 7β-(p-nitrobenzyloxycarbamido)-7α-methoxy-3-(1-methyltetrazol-5-ylthiomethyl)-3-cephem-4-carboxylate. The product was purified by preparative thin layer chromatography.

nmr (CDCl$_3$): 3.5 (s, 1H, C$_7$ amide) 4.97 (s, 1H, C$_6$ H) 5.63 (d, 2H, C$_3$ methylene) 6.19 (s, 3H, tetrazole 1-methyl) and 6.43 (s, 3H, C$_7$ methoxy) tau.

EXAMPLE 8

7β-amino-7α-methoxy-3-(1-methyltetrazol-5-ylthiomethyl)-3-cephem-4-carboxylate The product obtained as described in Example 7 (1.05 g., 1.5 mmole) was dissolved in a mixture of 15 ml. of acetonitrile and 60 ml. of methanol. The solution was cooled to ice bath temperature and with stirring, two 4.5 ml. portions of a solution of 1.74 g. (10 mmole) of sodium dithionate (Na$_2$S$_2$O$_6$) in 10 ml. of dibasic phosphate buffer were added over a 10 minute period. The reaction mixture was then poured into 200 ml. of a mixture of 50 ml. of ethyl acetate and 150 ml. of dilute dibasic phosphate buffer. The organic layer was separated and dried over magnesium sulfate. The dried extract was evaporated to dryness to yield the reduction product as a residue.

The residue was dissolved in 30 ml. of methylene chloride and 2 g. of silica gel were suspended in the solution. The suspension was stirred for 3 hours at room temperature and filtered. The silica gel was washed on the filter with methylene chloride and the filtrate was evaporated to dryness to yield 310 mg. of diphenylmethyl 7β-amino-7α-methoxy-3-(1-methyltetrazol-5-ylthiomethyl)-3-cephem-4-carboxylate.

nmr (CDCl$_3$): 5.17 (s, 1H, C$_6$ hydrogen) 5.62 (d, 2H, C$_3$ methylene) 6.19 (s, 3H, tetrazole 1-methyl group) and 6.46 (s, 3H, C$_7$ methoxy) tau.

EXAMPLE 9

Diphenylmethyl 7β-(p-nitrobenzyloxycarbamido)-7α-methoxy-3-carbamoyloxymethyl-3-cephem-4-carboxylate To 250 ml. of dry THF under nitrogen were added 19 ml. of 1.85 N methyl lithium in diethyl ether with stirring. Next, 40 ml. of dry methanol were slowly added and the solution was allowed to stir for 10 minutes before being cooled in a dry ice-acetone bath. A solution of 6.18 g. (10 mmole) of diphenylmethyl 7β-(p-nitrobenzyloxycarbamido)-3-carbamoyloxymethyl-3-cephem-4-carboxylate in 80 ml. of THF was added to the cold solution which was then stirred for 2 minutes before 2 ml. of t-butyl hypochlorite were added. The cold reaction mixture was stirred for 20 minutes and 40 ml. of glacial acetic acid containing 2 ml. of trimethyl phosphite were added. The mixture was allowed to warm to room temperature, was evaporated, and the residue dissolved in dichloromethane. The solution was washed with a saturated solution of sodium chloride and with a saturated solution of sodium bicarbonate and dried. The dried solution was evaporated under vacuum to yield 6.6 g. of reaction product mixture.

The reaction product mixture was dissolved in 100 ml. of benzene containing 4% ethyl acetate and the solution was chromatographed over a column packed with 300 g. of silica (containing 15% water and added to the column as a slurry in benzene).

Elution was carried out with benzene containing increasing percentages of ethyl acetate as follows:

| Volume of Eluant (liters) | Percent Ethyl acetate in Benzene (v:v) |
|---|---|
| 1 | 4 |
| 1 | 8 |
| 2 | 12 |
| 2 | 16 |
| 1 | 20 |

Multiple fractions of 250 ml. each were collected and aliquots thereof were evaporated and the residual product assayed in the nmr. Fractions 19–26 were combined and evaporated to dryness to yield 2.1 g. of diphenylmethyl 7β-(p-nitrobenzyloxycarbamido)-7α- methoxy-3-carbamoyloxymethyl-3-cephem-4-carboxylate.

nmr (CDCl₃) 4.94 (s, 1H C₆H) 6.24 (s, 3H, C₇ methoxy) and 6.34–6.66 (m, 2H, C₂ hydrogen) tau

EXAMPLE 10

Diphenylmethyl 7β-amino-7α-methoxy-3-carbamoxyloxymethyl-3-cephem-4-carboxylate

The 2.1 g. of product obtained as described in Example 9 were dissolved in 100 ml. of a 1:1 (v:v) mixture of methanol-THF and a prereduced suspension of 2.1 g. of 5% palladium on carbon in 100 ml. of 1:1 MeOH-THF was added. The mixture stirred at room temperature for 3.5 hours under one atmosphere of hydrogen. After hydrogen uptake had ceased, the mixture was filtered and the filtrate was evaporated to yield 1.94 g. of the reduction product intermediate.

The intermediate was dissolved in 60 ml. of dichloromethane and 5 g. of silica gel (Merck Chromatography Grade) were added. The suspension was stirred for 2 hours at room temperature, was filtered and the filtrate evaporated to yield 810 mg. of diphenylmethyl 7β-amino-7α-methoxy-3-carbamoyloxymethyl-3-cephem-4-carboxylate.

nmr (CDCl₃): 4.13 (broad s, 2H, carbamoyl NH) 5.06 (s, 1H, C₆H) 6.50 (s, 3H, C₇ methoxy) and 7.19 (broad s, 2H, H₂N—C—OCH₃) tau

We claim:

1. The method for preparing a 7β-amino-7α-methoxy-3-cephem ester of the formula

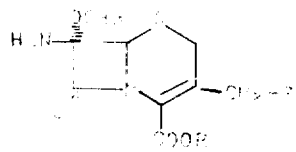

which comprises a. reacting a 7β-(p-nitrobenzyloxycarbamido)-3-cephem ester of the formula

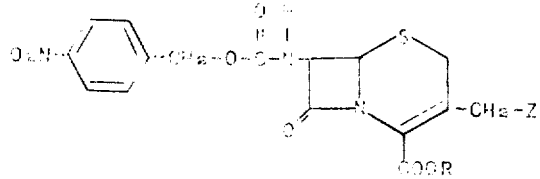

in the presence of excess methanol in an inert, anhydrous solvent at a temperature between −120° and −25°C. with methyl lithium in an amount corresponding to between 2 and 6 moles per mole of cephem ester, to form in said reaction mixture, the anionic form of the cephem ester of the formula

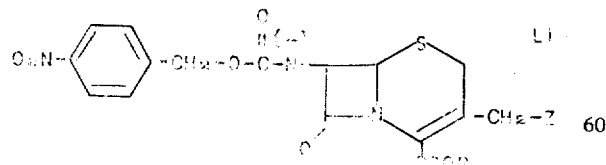

b. adding to said reaction mixture between 1 and 5 moles of t-butyl hypochlorite per mole of cephem ester;

c. acidifying said reaction mixture and recovering a 7β-(p-nitrobenzyloxycarbamido)-7α-methoxy-3-cephem ester of the formula

d. reacting said methoxy 3-cephem ester in an inert solvent with a reducing agent selected from the group consisting of hydrogen in the presence of a palladium catalyst and an alkali or alkaline metal salt of dithionic acid at a pH between about pH 7 and pH 8, and recovering from said reduction mixture the methoxy 3-cephem ester reduction product;

e. acidifying said methoxy 3-cephem reduction product in an acidic medium selected from the group consisting of an aqueous medium at a pH of between about pH 4 and pH 6 and an inert liquid medium containing in suspension silica gel, and recovering the 7β-amino-7α-methoxy-3-cephem ester from said acidic medium; where in the above formulae Z ie hydrogen C₂–C₄ alkanoyloxy, C₁–C₄ alkoxy, C₁–C₄ alkylthio, a carbamoyloxy group of the formula

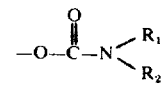

wherein

R₁ and R₂ independently are hydrogen or C₁–C₄ lower alkyl, or

Z is a five-membered heterocyclic thio group selected from the group consisting of a 5-thiotetrazole of the formula

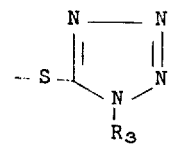

a 2-thio-1,3,4-thiadiazole of the formula

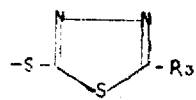

and a 2-thio-1,3,4-oxadiazole of the formula

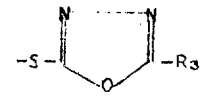

wherein

R₃ is hydrogen, C₁–C₄ alkyl or phenyl; and

R is benzyl, p-nitrobenzyl, p-methoxybenzyl, diphenylmethyl or 2,2,2-trichloroethyl.

2. The method of claim 1 wherein Z is hydrogen, acetoxy or methoxy and R is diphenylmethyl.

3. The method of claim 1 wherein Z is

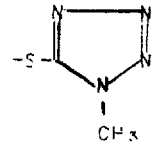

or

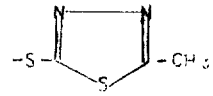

4. The method of claim 1 wherein Z is

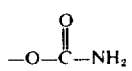

and R is diphenylmethyl.

5. The method of claim 2 wherein the 7β-(p-nitrobenzyloxycarbamido)-7α-methoxy-3-cephem ester is reduced with hydrogen in the presence of a palladium catalyst.

6. The method of claim 3 wherein the 7β-(p-nitrobenzyloxycarbamido)-7α-methoxy-3-cephem ester is reduced with sodium dithionate.

7. The method of claim 1 wherein the methoxy 3-cephem ester reduction product is commingled with silica gel in an inert liquid medium.

* * * * *

Page 1 of 2

UNITED STATES PATENT AND TRADEMARK OFFICE
CERTIFICATE OF CORRECTION

PATENT NO. : 3,897,424
DATED : July 29, 1975
INVENTOR(S) : Gary A. Koppel and William H. W. Lunn It is certified that error appears in the above-identified patent and that said Letters Patent are hereby corrected as shown below:

That portion of the Title reading "-7-$\alpha$-Methoxy-Cephalospo-" should read -- -7-$\alpha$-Methoxycephalospo- --.

Column 1, line 2, "7-$\beta$-Amino-7-$\alpha$-Methoxy-cephalosporanic" should read -- 7-$\beta$-Amino-7-$\alpha$-Methoxycephalosporanic --;

Column 2, line 23, "acylamide" should read --acylamido--;

Column 8, line 14, "nitrobenzyloxycarbamidol" should read --nitrobenzyloxycarbamido--;

Column 17 in claim 1, the first structural formula should read

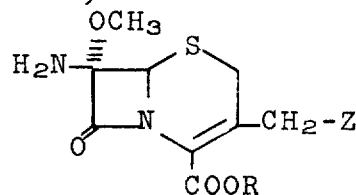

, the second formula should read

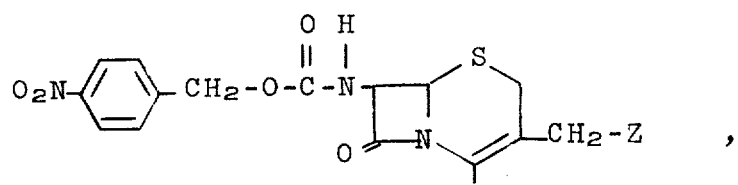

, and the last formula should read

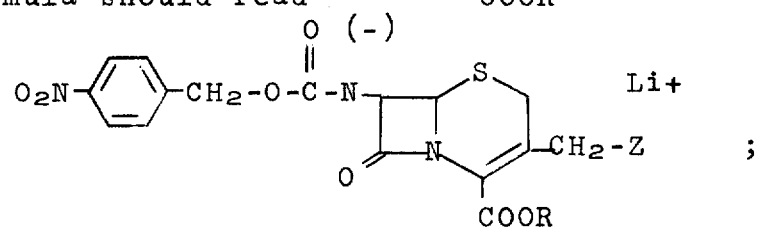

;

UNITED STATES PATENT AND TRADEMARK OFFICE
CERTIFICATE OF CORRECTION

PATENT NO. : 3,897,424
DATED : July 29, 1975
INVENTOR(S) : Gary A. Koppel and William H. W. Lunn It is certified that error appears in the above-identified patent and that said Letters Patent are hereby corrected as shown below:

Column 18, lines 1-5, the structural formula should read

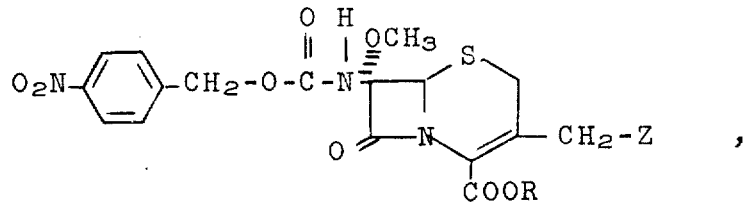

Column 18, lines 48-51, the structural formula should read

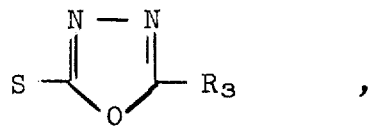

Column 18, lines 60-64, the structural formula should read

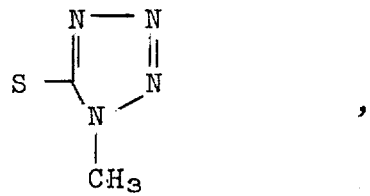

Column 18, line 65, the word --or-- should appear on the right hand portion of the column.

Column 18, lines 66-70, the structural formula should read

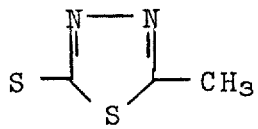

Signed and Sealed this thirteenth Day of April 1976

[SEAL]

Attest:

RUTH C. MASON
Attesting Officer

C. MARSHALL DANN
Commissioner of Patents and Trademarks